Figure 1:
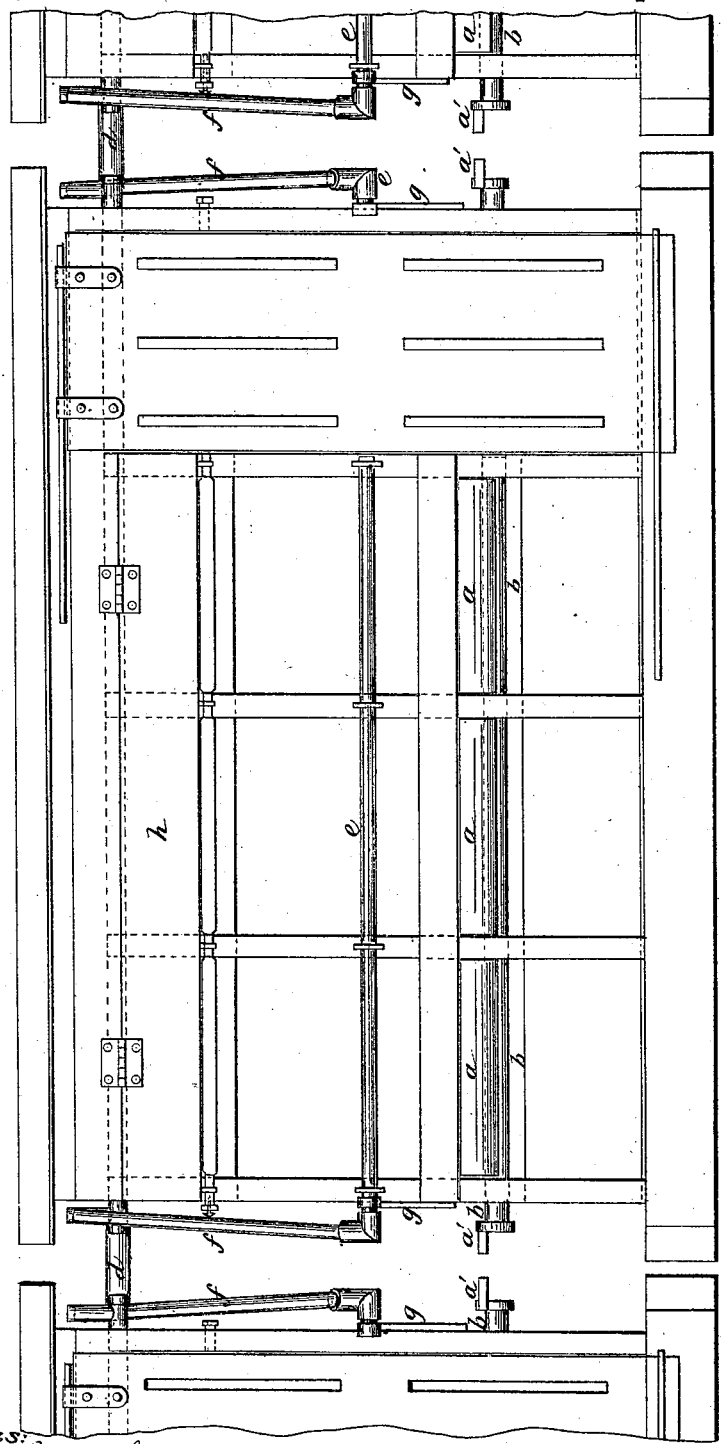

(No Model.) 3 Sheets—Sheet 1.

J. R. McPHERSON.
STOCK CAR.

No. 256,153. Patented Apr. 11, 1882.

Witnesses:
Edmond Brodhag
H. C. Bartle

Inventor:
pro John R. McPherson
Johnson and Johnson
Attys.

(No Model.)
3 Sheets—Sheet 2.

J. R. McPHERSON.
STOCK CAR.

No. 256,153. Patented Apr. 11, 1882.

Witnesses:
Edmond Brodhag
H. C. Bartle

Inventor:
pro John R. McPherson
Johnson and Johnson
Attys (No Model.)  3 Sheets—Sheet 3.

J. R. McPHERSON.
STOCK CAR.

No. 256,153. Patented Apr. 11, 1882.

Witnesses:
Elmond Brodhag
H. C. Bartle.

Inventor:
pro John R. McPherson
Johnson and Johnson
Attys

UNITED STATES PATENT OFFICE.

JOHN R. McPHERSON, OF SEABRIGHT, NEW JERSEY.

STOCK-CAR.

SPECIFICATION forming part of Letters Patent No. 256,153, dated April 11, 1882.

Application filed October 17, 1881. (No model.)

*To all whom it may concern:*

Be it known that I, JOHN R. McPHERSON, a citizen of the United States, residing at Seabright, in the county of Monmouth and State of New Jersey, have invented new and useful Improvements in Means for Watering Stock in Cars, of which the following is a specification.

In watering stock while being carried by rail in cars the simultaneous and uniform distribution of the water in the several cars of the train from a single point of supply is important as a matter of economy in time when the train is standing, and conduces to the comfort and quiet of the animals, by reason of effecting the supply as near as possible at the same time and in equal quantity in each car. Especially do these matters become important in long trains running upon schedule-time. In effecting these objects my improvements also effect an economy in labor in working the appliances, lessen the danger of freezing the supply-pipes in cold weather, provide for easily and quickly making the connections for service, and avoid encumbering the doorways with pipe-connections. A pipe located in the top of each car forms, when coupled throughout the train, the supply-pipe, which may be put into service at one end with the fountain of supply, and by suitable connections with distributing-pipes upon the sides of the cars deliver the water into troughs from which the stock drink. Such arrangement of supply and delivering pipes is old in the state of the art; but the distributing-connections with the supply-pipe have been such as to allow the water to run out of the supply-pipe before it could be filled throughout the train, and the cars thus supplied one after another in succession in the direction of the flow in the supply-pipe. Moreover, in thus effecting the supply from a single pipe from one end only of a long train the water would be depleted in its flow so rapidly from the supply-pipe as to render its delivery inadequate in the last cars of the train, and thus tend to unduly excite the animals, and require a longer time to complete the watering than if the supply were uniform and simultaneous in each car of the train from such supply-pipe. By my improvement the supply-pipe is caused to be filled throughout the train from the service-connection at one end only before the delivery from the pipe-openings commences in any of the cars, so that the troughs of each car are thereby supplied at the same time and with an equal amount of water. To obtain this result the connection of each side distributing-pipe is made with the upper surface of the supply-pipe, so that the latter must be filled before it can discharge the water. One side distributing-pipe connects with the supply-pipe at one end of the car and the other side pipe is connected in the same manner at the other end of the car. The distributing-pipes extend only to the doorways, which are arranged at the sides of the car alternately at each end.

Figure 3:
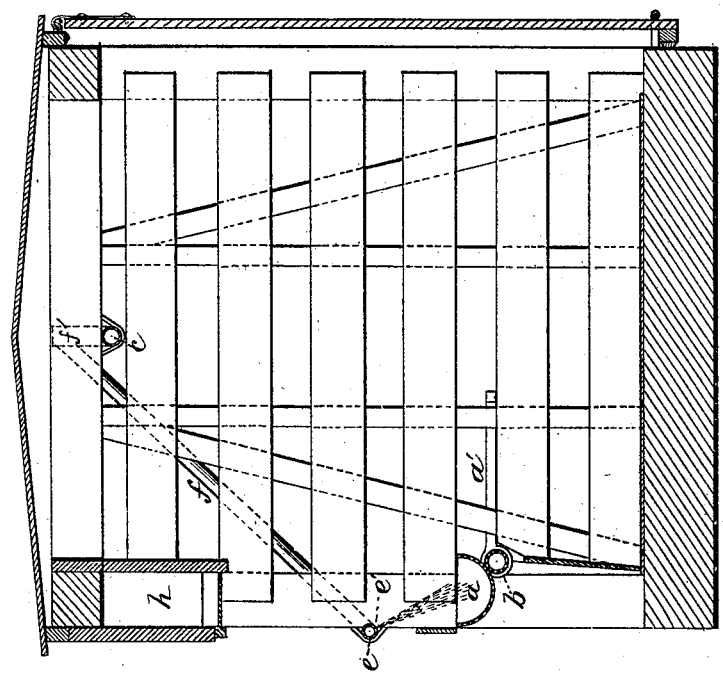
Figure 2:
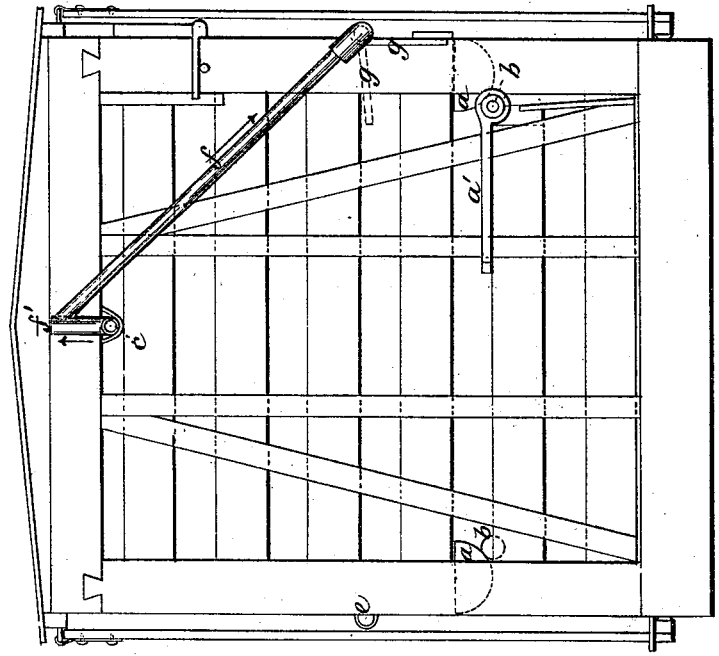
Figure 4:
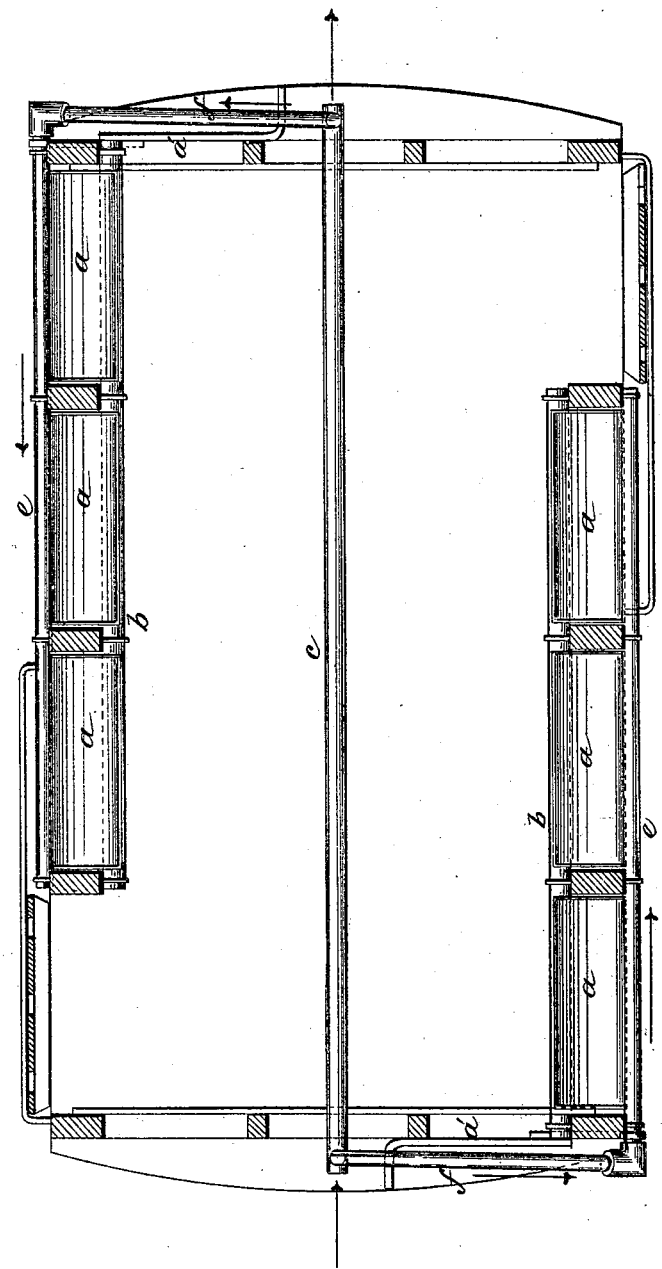

Referring to the accompanying drawings, Figure 1 represents a side view of a car embracing my improvements, and showing the continuous connection of the top water-supply pipe in the train; Fig. 2, an end elevation of a car, showing the connection of the distributing-pipe on one side with the top portion of the supply-pipe; Fig. 3, a vertical cross-section of the same, showing the side distributing-pipes and their relation to the troughs; and Fig. 4, a horizontal section of the car, showing the arrangement of the distributing-pipes.

The troughs $a$ are arranged in sections between the studs at each side of the car, and are adapted to be turned in position to feed and water, and to be turned down outwardly when not in use. They are secured upon pipes $b$, mounted in bearings in the wall-studs, and extend from the opposite ends of the car to the doorways, which are arranged in the sides alternately at each end. Each trough-pipe is provided with a lever, $a'$, at one end of the car, by which to turn the trough as may be required for use or non-use, and to hold it in the required position.

A pipe, $c$, of suitable capacity, is properly secured in the top of each car so as to project a short distance beyond the ends thereof, and adapted to be made continuous in the train by hose-connections $d$ between the cars, as shown in Fig. 1. This pipe by suitable provision is adapted to be connected at one end only with the stand-tank or reservoir erected along the track at stations, or from other source or fountain from which, by the force of gravity or by mechanical force, the water is supplied to said top connected pipes, which thus forms the train-supply pipe.

Arranged upon each side of the car at a suitable distance above the troughs is a pipe, e, provided with openings e', suitably made along the length of the pipe. These pipes are mounted in bearings in the wall-studs, and extend only to the doorways, and they project at one end only of the car. Such projecting ends are at the opposite ends of the car, and they are connected with the supply-pipe by pipes f, by which the perforated side pipes, e, receive the water and deliver or distribute it into the troughs. By this arrangement the distributing-pipe on one side of the car is supplied from one end and the pipe on the other side from the other end of the car, as shown by the arrows in Fig. 4. To render such distribution simultaneous and uniform in all the cars of the train, the pipes f are connected by a vertical branch, f', or otherwise, to the upper surface of the supply-pipe, as shown in Fig. 2, whereby the supply-pipe, when put in communication with the source of supply, is caused to be filled throughout the train before the water can run out through the said pipes f into the distributing-pipes, and thereby deliver the water into the troughs of all the cars at the same time and with equal flow. This prevents the animals in the first car from being supplied before those in the next or succeeding cars, and thereby promotes quiet and harmony among them. While the supply-pipe therefore has a perpetual communication with the distributing-pipes of each car, yet the distribution can only commence when the supply-pipe is filled and under pressure from the contained water throughout the train. The connections with the supply-pipe by which this result is obtained need only extend a sufficient distance above it to insure that the outflow therefrom will not commence until the pipe is filled to the end of the train.

The distributing-pipes are adapted to be turned in their bearings so as to bring their perforations in positions for directing showers over and upon swine from each side of the car in the summer season. For this purpose the distributing-pipes can be turned upon suitable joint-connections with the pipes f by means of levers g, so as to direct the water into the troughs or inward and upward over the swine to cool and refresh them. In uncoupling the service-pipe the water in the supply-pipe will run out, and thus prevent freezing in the winter season. The hose-couplings between the cars can be uncoupled after watering for the same purpose.

Food-supplying bins h are arranged in the upper side walls of the car, with suitable valves, tubes, or sluices, adapted to deliver the food into the troughs in regulated quantities.

Access may be had to the food-supplying bins from the sides or top of the car. When the train is made up the rear end of the supply-pipe must be suitably closed.

The cars are constructed suitably for the transportation of live stock, and the troughs and distributing-pipes can be arranged for single or double deck cars. When a double-decker is used each distributing-pipe is independently connected with the supply-pipe.

Cars for horses, cattle, hogs, and sheep can be used in the same train with the same water-supply connections.

I claim—

1. As an improvement in means for supplying water to stock in transit in cars, the top supply-pipe, c, coupled throughout the train and having the distributing-pipe connections f of each car at the upper side or top part of said supply-pipe, substantially as described, for the purpose specified.

2. In railway-cars for the transportation of live stock, the means, substantially as herein described, for supplying water to the stock, consisting of the top supply-pipe, c, coupled throughout the train, the perforated side distributing-pipes, and the pipes f f, the latter connecting alternately one end of each distributing-pipe of each car with said supply-pipe at the upper side or top part thereof, substantially as described, for the purpose specified.

3. The combination, in a stock-car having side doors arranged alternately at each end, of the top coupled supply-pipe, c, the side distributing-pipe, and the pipes f f, arranged to connect one end of each distributing-pipe of each car with one end of said supply-pipe at its top part or upper surface, the said distributing-pipes having the relation to the doors substantially as described, for the purpose specified.

In testimony whereof I have hereunto set my hand in the presence of two subscribing witnesses.

JOHN R. McPHERSON.

Witnesses:
A. E. H. JOHNSON,
J. W. HAMILTON JOHNSON.